(12) United States Patent
Tsou

(10) Patent No.: US 8,710,986 B2
(45) Date of Patent: Apr. 29, 2014

(54) GAZE TRACKING PASSWORD INPUT METHOD AND DEVICE UTILIZING THE SAME

(75) Inventor: Chia-Chun Tsou, New Taipei (TW)

(73) Assignee: Utechzone Co., Ltd., New Taipei (TW)

( * ) Notice: Subject to any disclaimer, the term of this patent is extended or adjusted under 35 U.S.C. 154(b) by 196 days.

(21) Appl. No.: 13/353,870

(22) Filed: Jan. 19, 2012

(65) Prior Publication Data

US 2013/0187773 A1 Jul. 25, 2013

(51) Int. Cl.
*G08B 21/00* (2006.01)

(52) U.S. Cl.
USPC .......................... 340/540; 340/5.1; 340/5.74

(58) Field of Classification Search
USPC ......... 340/540, 5.1, 5.2, 5.51, 5.54, 5.3, 5.32, 340/5.28, 5.74
See application file for complete search history.

(56) References Cited

U.S. PATENT DOCUMENTS

| 7,986,816 B1 * | 7/2011 | Hoanca et al. ............... 382/115 |
| 2005/0188213 A1 * | 8/2005 | Xu ............................... 713/186 |
| 2006/0287012 A1 * | 12/2006 | Lan .......................... 455/575.1 |

* cited by examiner

*Primary Examiner* — Daniel Previl
(74) *Attorney, Agent, or Firm* — Morris Manning & Martin LLP; Juan Carlos A. Marquez

(57) ABSTRACT

A gaze tracking password input method and a device utilizing the same wherein the method includes the following steps: picking up photo images of a person's eyes by a photographing unit which continually takes photo shots at a particular area as the person approaches to the photographing unit and his eye enters the particular area; transmitting the photo images taken at the particular area to an operation unit; setting a script associated with a particular point as a password; and then determining the person's gaze tracking direction which indicates the script to be input by the operation unit. The operation unit comparing the multiple input scripts with predetermined passwords, if the input scripts are matched with the predetermined passwords, then the person is officially authorized.

17 Claims, 9 Drawing Sheets

GAZE TRACKING PASSWORD INPUT METHOD AND DEVICE UTILIZING THE SAME

BACKGROUND OF THE INVENTION

1. Technical Field

The present invention relates to a method of inputting passwords, and in particular a method of inputting passwords in accordance with tracked gazes of a person in use of the device.

2. Description of Related Art

The currently available password input method uses a keyboard to input numerals, characters, or symbols into a device or a machinery; if the input scripts conforms to preset passwords, then an identifying process is officially approved and the device or a process carried out in the device is started.

However, if the input of a password is spied on by other people, the divulgence of the password becomes unavoidable in operation. Besides, the detection of the left fingerprints or temperature on the keyboard can also be employed to steal or copy an input password. Even the most advanced iris identification cannot differentiate if a person inputting such a data is under free will. The palm print or finger print identification device can also fail due to the copy of the palm prints or finger prints being possible in one aspect and the input of such data of a person cannot be identified to be carried out under free will in another aspect. Moreover, in case a person under abduction is forced to carry out an unlock operation, he or she can gaze at a help-seeking script in silence for asking for rescue.

SUMMARY OF THE INVENTION

In view of this, the object of the present invention is to provide a gaze tracking password input method whereby the input password is determined by way of the detection of a person's line of sight.

One preferred embodiment of the gaze tracking password input method of the present invention includes the following steps:

Setting up a password input device comprising a photographing unit, a display unit, and an operation unit; the photographing unit, which continually picks up photo images of a particular area and transmits the same to the operation unit; a person approaching the password input device with the person's eyes coming close to the particular area so that the photographing unit can take the photo images of the eyes of the person, which are transmitted to the operation unit; the operation unit identifying the person's approach; focusing the person's eyes onto an input zone to carry out the input of a password; the operation unit will find out the input photo images of the person's eyes focusing on a numeral, character, or symbol picked up in the input zone by the photographing unit as an input of a set of password; the person's eyes keeps on gazing at the input zone for the input of a password; the operation unit will determine the numerals, characters, or symbols on which the person's eyes focus as a next input of a set of password; after all passwords are input, the operation unit will compare the input numerals, characters, or symbols with preset passwords; if the comparison is correctly matched, then the person's identification is officially approved.

In the precedent preferred embodiment, it further includes the following steps: as the operation unit assures the approach of the person and begins to show in the display unit the input zone and a password zone wherein the input zone is provided with a multiple of numerals, characters, or symbols and the password zone is made up of a plurality of input boxes; as the operation unit identifies the numerals, characters and the symbols in the input zone, onto which the person's eyes focus as a completed input in one of the input boxes of the password zone.

In the precedent preferred embodiment, the operation unit further includes a storage unit in which those input numerals, characters, or symbols are stored for the time being, as all the input boxes of the password zone as shown have been filled up; the operation unit will compare those input numerals, characters, or symbols with the preset passwords. As those input boxes of the password zone show similar symbols, it means the passwords in those input boxes have been input in success.

In the precedent preferred embodiment, the input zone can be set in a dynamic display mode, the numerals, characters, or symbols in the input zone will be changed along with time.

The precedent preferred embodiment further includes the following steps: as a numeral, character, or symbol in the input zone, onto which is specifically focused by a person's eyes, those focused scripts will be illuminated themselves to indicate that they have been input as passwords.

The precedent preferred embodiment further includes the following steps: as a numeral, character, or symbol in the input zone, onto which is specifically focused by a person's eyes, the lights disposed above those focused scripts will be illuminated to indicate that they have been input as passwords. In such a situation, the numerals, characters, or symbols are disposed in a printed form in the input zone.

The precedent preferred embodiment further includes the following steps: a rescue-seeking script is disposed in the input zone, as a person's eyes gaze at the rescue-seeking script determined by the operation unit, the operation unit will send out a rescue alarm signal.

The gaze tracking password input method described above can protect passwords from leakage and can be widely applied to the lock mechanism of the household door locks, door locks in hotels, door locks for safes, and other security equipment. Moreover, it can also be applied to the password input operations in automatic cash dispensers and to any other processes in need of identification of passwords. Moreover, the user must be in conscious will to input the password. As the user under abduction is being forced to input passwords, the user can input a help-seeking password by gazing at the numerals, characters, or symbols; the system will send out rescue alarm signals to the police station.

In order to make the other objects, features and advantages of the above described present invention understood in a clearer manner, one preferred practice of the embodiment of the present invention in company with the attached diagrams is disclosed in details below.

BRIEF DESCRIPTION OF THE DRAWINGS OF THE PRESENT INVENTION

The features and advantages of the present invention and further details of a process of the related device in accordance with the present invention will be more clearly understood from the following description taken in conjunction with the accompanying drawings in which like reference numerals designate similar or corresponding elements, regions and portions and in which.

DETAILED DESCRIPTION OF THE EMBODIMENTS OF THE INVENTION

Figure 1:
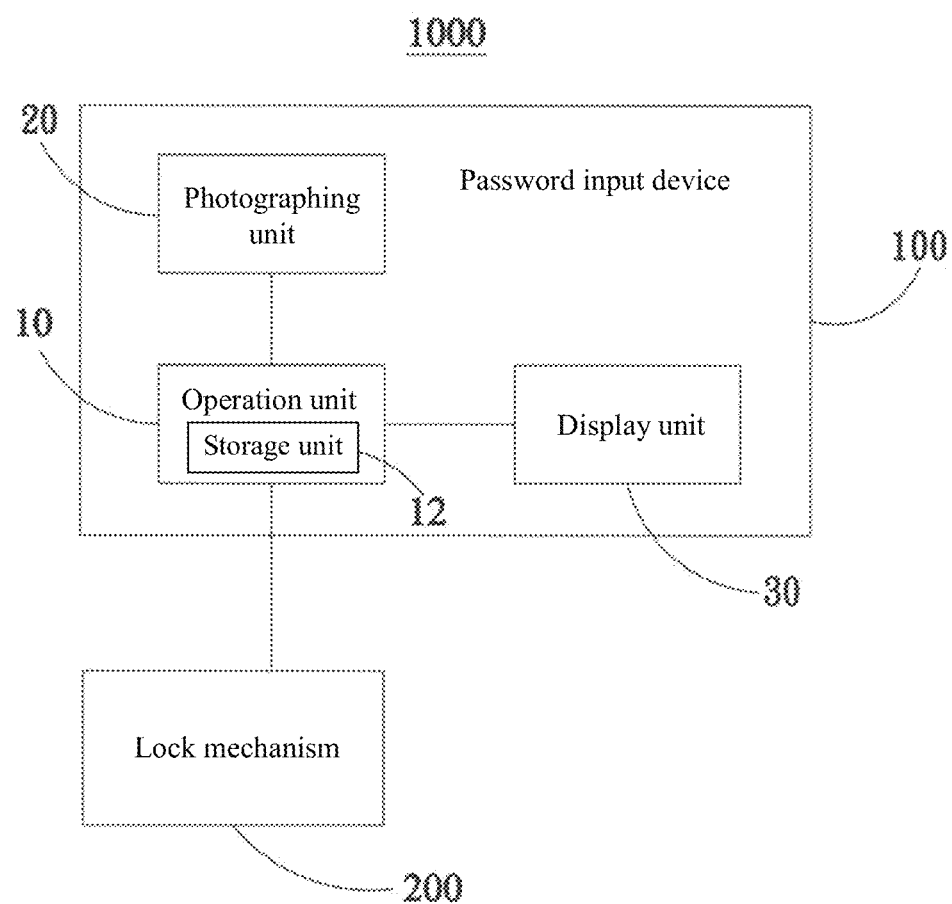
FIG. 1 is a block diagram showing a lock using the gaze tracking password input method of the present invention.
Figure 2:
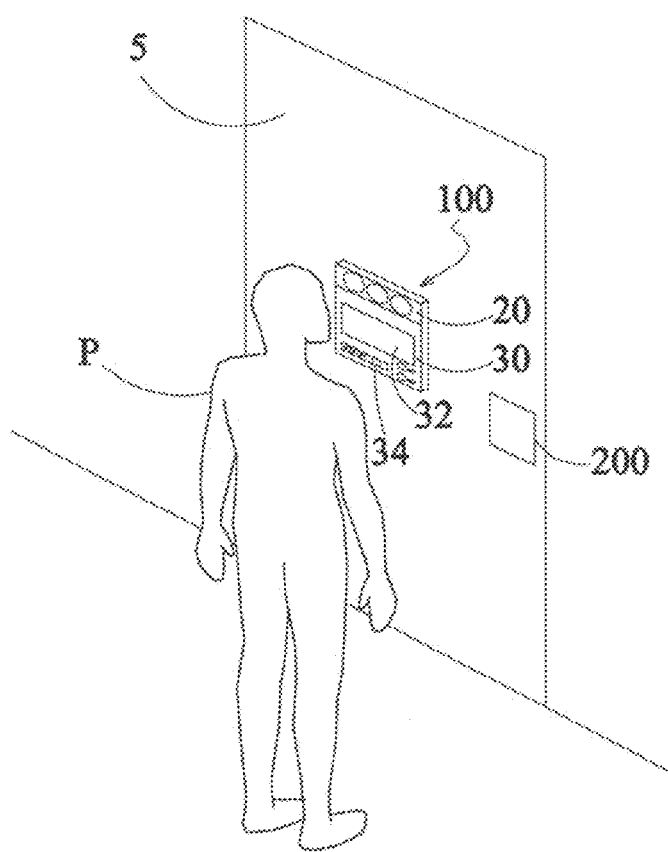
FIG. 2 is a perspective diagram showing one embodiment of a lock using the gaze tracking password input method of the present invention.

Referring to FIG. 1, the block diagram shows the application of the gaze tracking input method of the present invention to a lock. FIG. 2 is a perspective diagram showing the lock using the gaze tracking password input method of the present invention which includes a lock body 1000 comprising a password input unit 100 and a lock mechanism 200. The password input unit 100 is associated with the lock mechanism 200.

The password input device 100 is comprised of an operation unit 10, a photographing unit 20, and a display unit 30. The photographing unit 20 continually picks up photo images of the front area of the password input device 100 and transmits the taken photo images to the operation unit 10.

As shown in FIG. 2, as a person P approaches the password input device 100 with his or her eyes coming up to the above described photo taking area, the photographing unit 20 takes the person's P eye images which are then transmitted to the operation unit 10. At this moment, the operation unit 10 identifies the approach of the person P and will show on the display unit 30 an input zone 32 and a password zone 34. Shown in the input zone 32 are numerals, English letters, and a plurality of symbols. In the password zone 34 are provided with a plurality of input boxes 342. In the present practical embodiment, there are 6 input boxes shown in the password zone 34.

Figure 3:
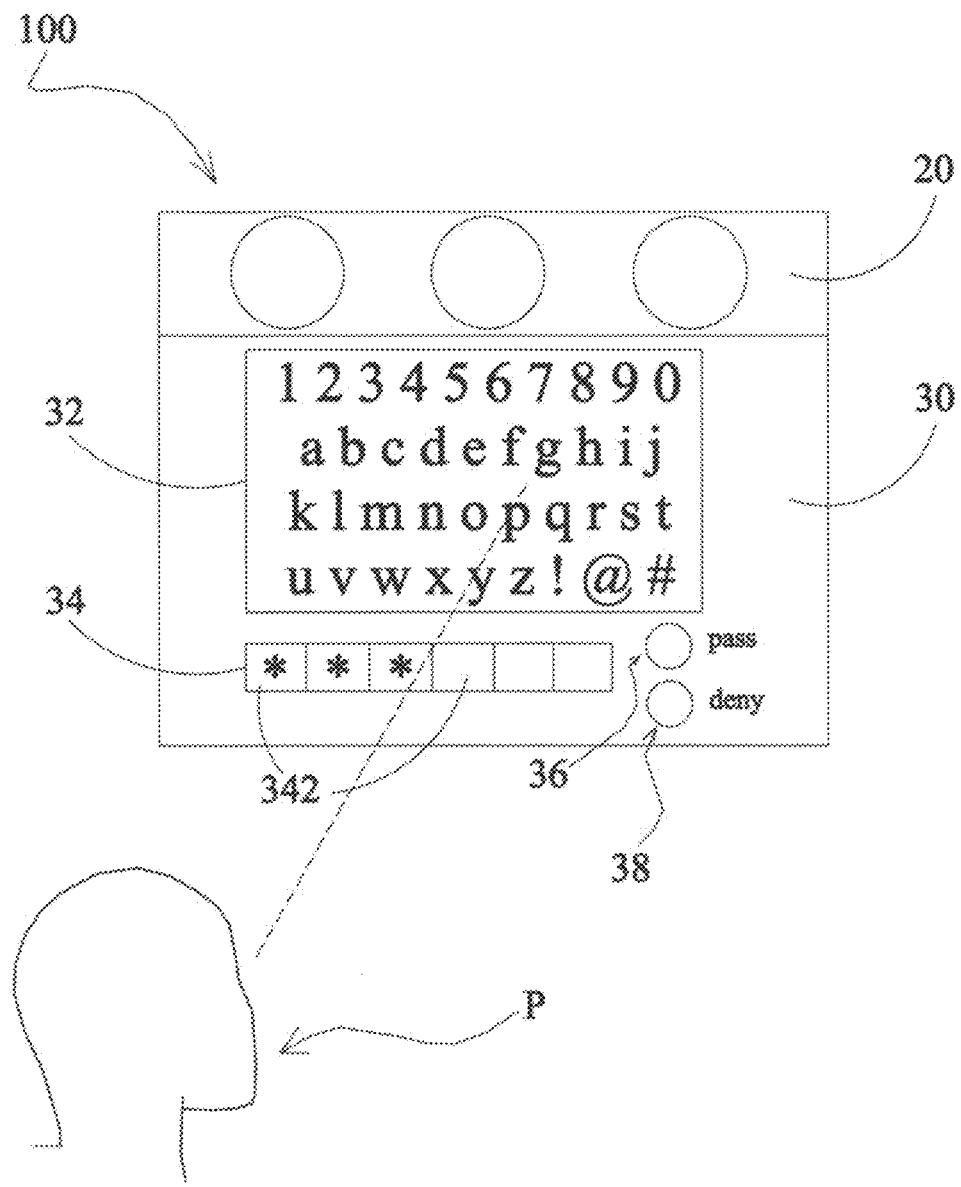
FIG. 3 is a diagram showing the input zone and the password zone of a display unit of a lock of one embodiment using the gaze tracking password input method of the present invention.

As the eyes of the person P gaze at the scripts of the input zone 32, the photographing unit 20 will pick up the photo images of the eyes of the person P. The operation unit 10 then calculates out the line of vision of the person P and determines at which script in the input zone 32 is gazed by the person P. In FIG. 3, it demonstrates that the letter g determined by the operation unit 10 is the person's P target of view (as illustrated by the dashed line). So the letter g is confirmed to be the password to be input by the person P. At the same time, the third input box 342 of the password zone 34 appears an asterisk *. As long as the asterisk * appears in an input box 342, it means the input of a password in that input box 342 has been completed. When an input box 342 is marked with the asterisk to indicate the input of a password in that input box 342 is completed, the photographing unit 20 continually picks up the photo image of the eyes of that person P to find out the line of vision of that person P again to perform the input of the next password in another input box 342. The same step is repeated until all the 6 input boxes 342 of the password zone 34 are filled up. The operation unit 10 will then compare the input scripts with preset passwords. If the comparison is correctly matched, then the person's identification is officially approved.

Although in this preferred embodiment an asterisk * is adopted to indicate completion of input, it is not limited for the use of such a mark. To fully blacken the input box 342 is another option to indicate the completion of input. Numerals, English letters, or symbols are chosen in the present embodiment as input of passwords, but it is not limited as a single way of input. In the input zone 32 of the present invention, the Chinese phonetic symbols or Japanese Hiragana or Katakana characters, letters of European languages, or any other scripts can be used as passwords.

In the display unit 30, there are disposed a green light 36 and a red light 38. The illumination of the green light 36 indicates the pass of identification and the light up of the red lights 38 stands for the failure of identification and the password must be input once more.

The password input device 100 is connected to the lock mechanism 200. After the person P in check is accepted, the operation unit 10 of the password input device 100 will send out a control signal to the lock mechanism 200, then the lock mechanism 200 will receive the control signal to get the lock mechanism unlocked accordingly.

The operation unit 10 comprises a storage unit 12, the input scripts by the person P will be stored first in the storage unit 12 until all the inputs in the input boxes 342 of the password zone 34 are completed. Then the operation unit 10 will pick up all the input scripts in the storage unit 12 and get them compared with the preset passwords.

Figure 4:
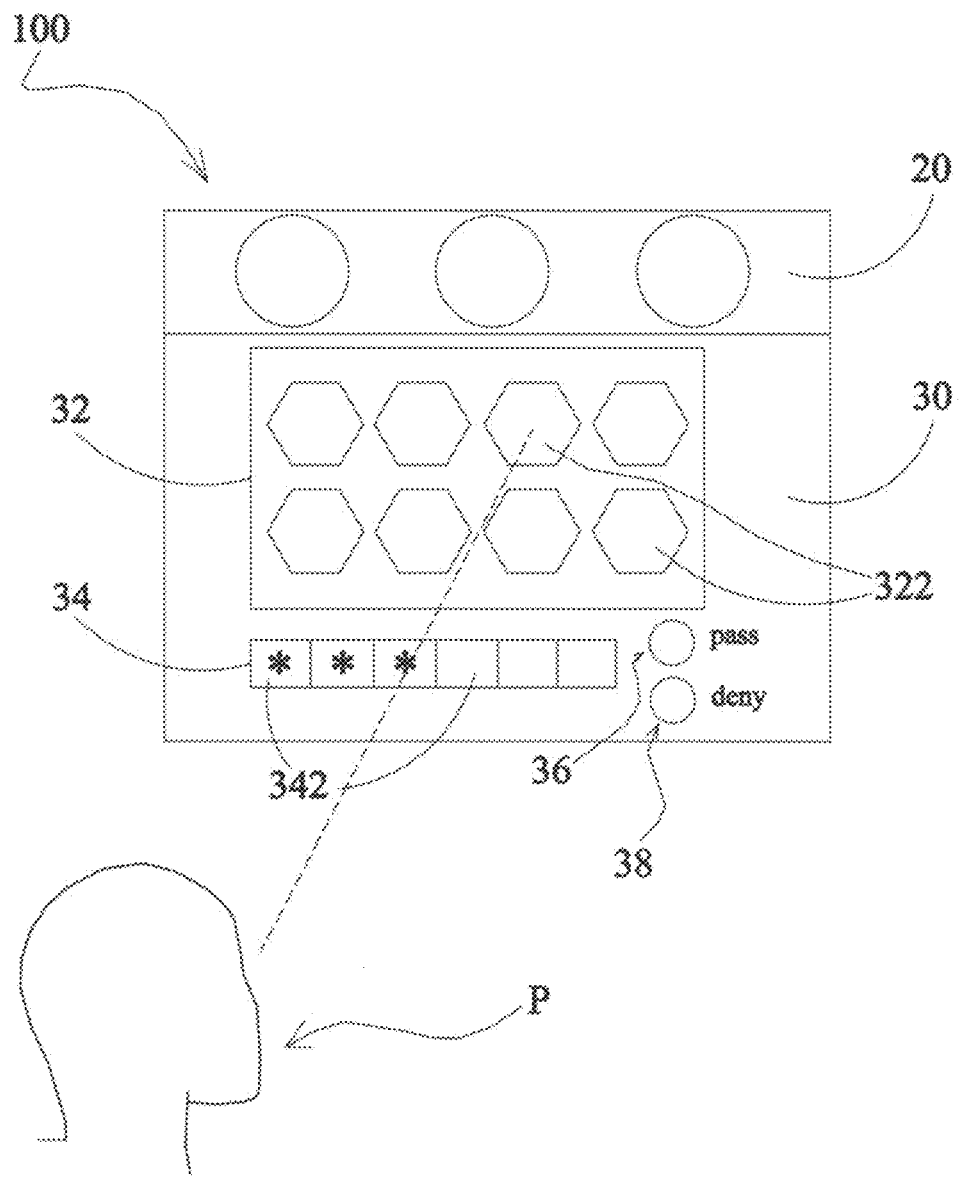
FIG. 4 is a diagram showing the input zone and the password zone of a display unit of a lock of another embodiment using the gaze tracking password input method of the present invention.

Referring to FIG. 4, an embodiment of another lock employing the gaze tracking password input method of the present invention. In the input zone 32, there is a plurality of designs 322 provided for input choice. The photographing unit 20 will take the photo image of the eyes of the person P in operation of the lock and the operation unit 10 will then calculate out the line of sight of the person P so as to decide which one of the designs 322 is to be input in the first block 342 in the password zone 34. As long as all the picked designs 322 are input sequentially into the 6 respective blocks 342, the operation unit 10 will perform a comparison of the 6 input designs 322 with a group of preset designs in a sequential order. If the input sequence of the designs is correctly matched, then the person P passes the identification.

The gaze tracking password input method of the present invention can be applied to door locks or safe locks wherein the lock mechanism 200 is installed on a door body 5 as shown in FIG. 3. The password input device 100 can be mounted onto the door body 5 or the surrounding wall of the door body 5.

Figure 5:
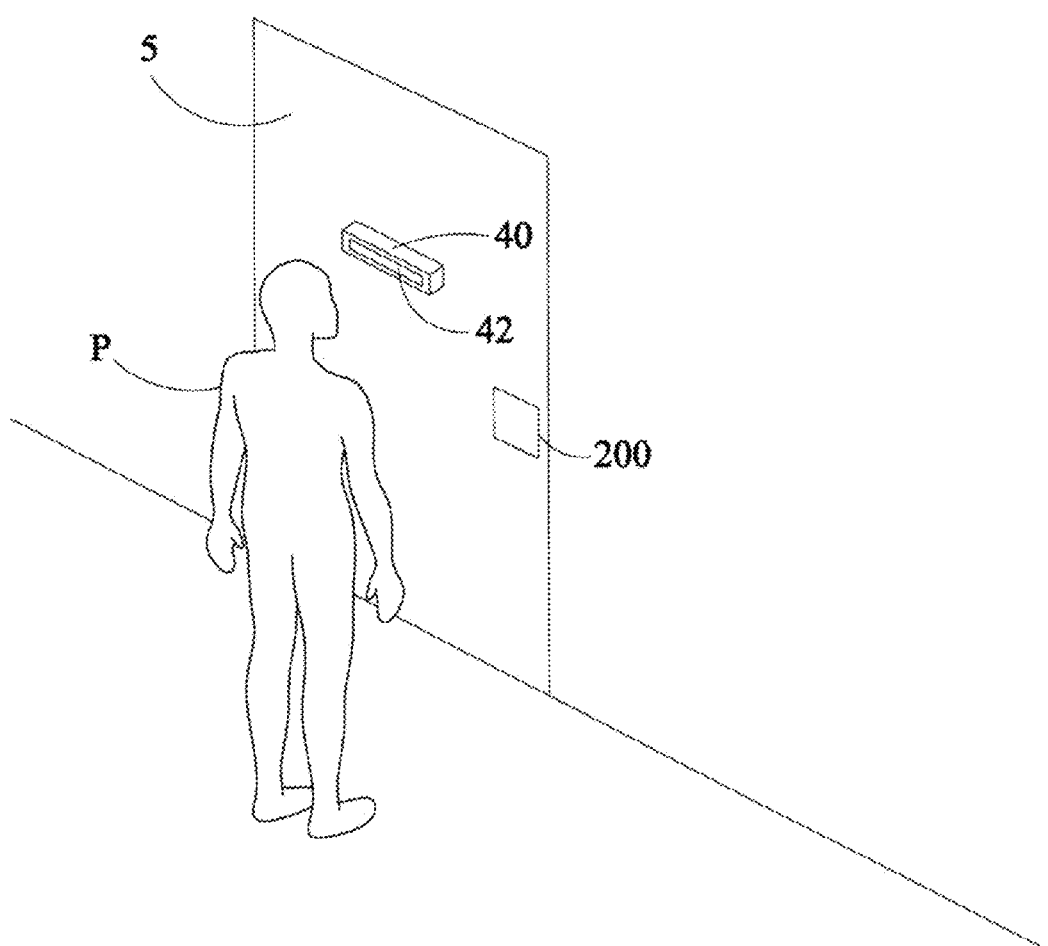
FIG. 5 is a diagram showing a lock of one other embodiment using the gaze tracking password input method of the present invention.
Figure 6:
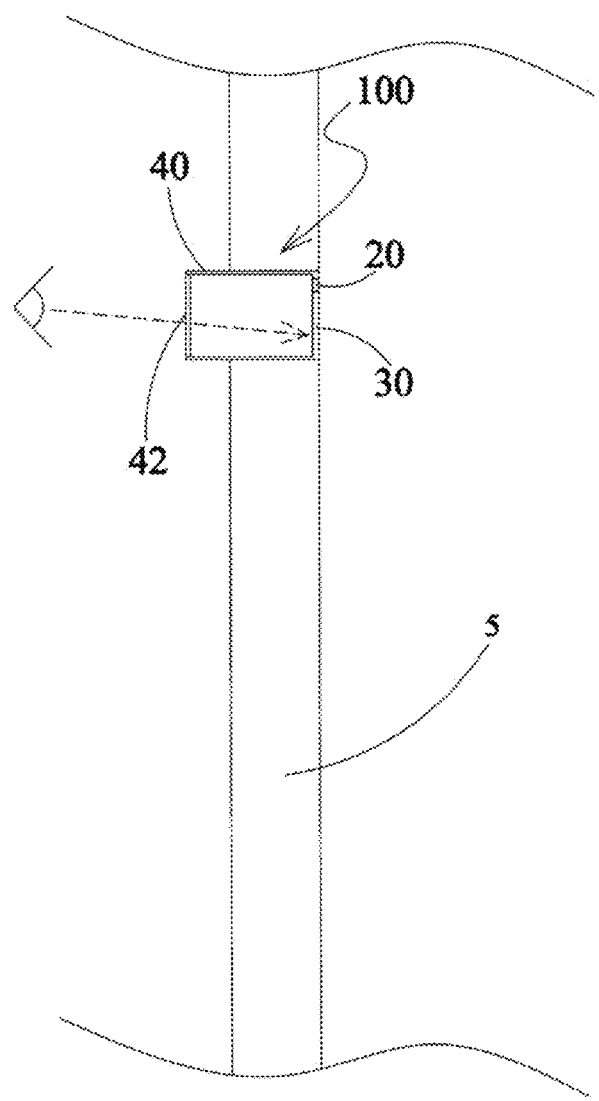
FIG. 6 is a side view of the lock shown in FIG. 5 using the gaze tracking password input method of the present invention.

Referring to FIG. 5, an embodiment of another lock employing the gaze tracking password input method of the present invention. In this embodiment, a shield 40 is disposed on the door 5 to cover the input zone 32 with a window 42 defined on the shield 40 so that the person P can gaze at the input zone 32 through the window 42 and the photographing unit 20 can pick up the photo images of the eyes of the person P. Then the operation unit 10 can find out via calculation the line of vision of the person P as shown in FIG. 6. The use of a shield 40 can surely protect the input process of the passwords from being watched so as to avoid stealing of the passwords.

Figure 7:
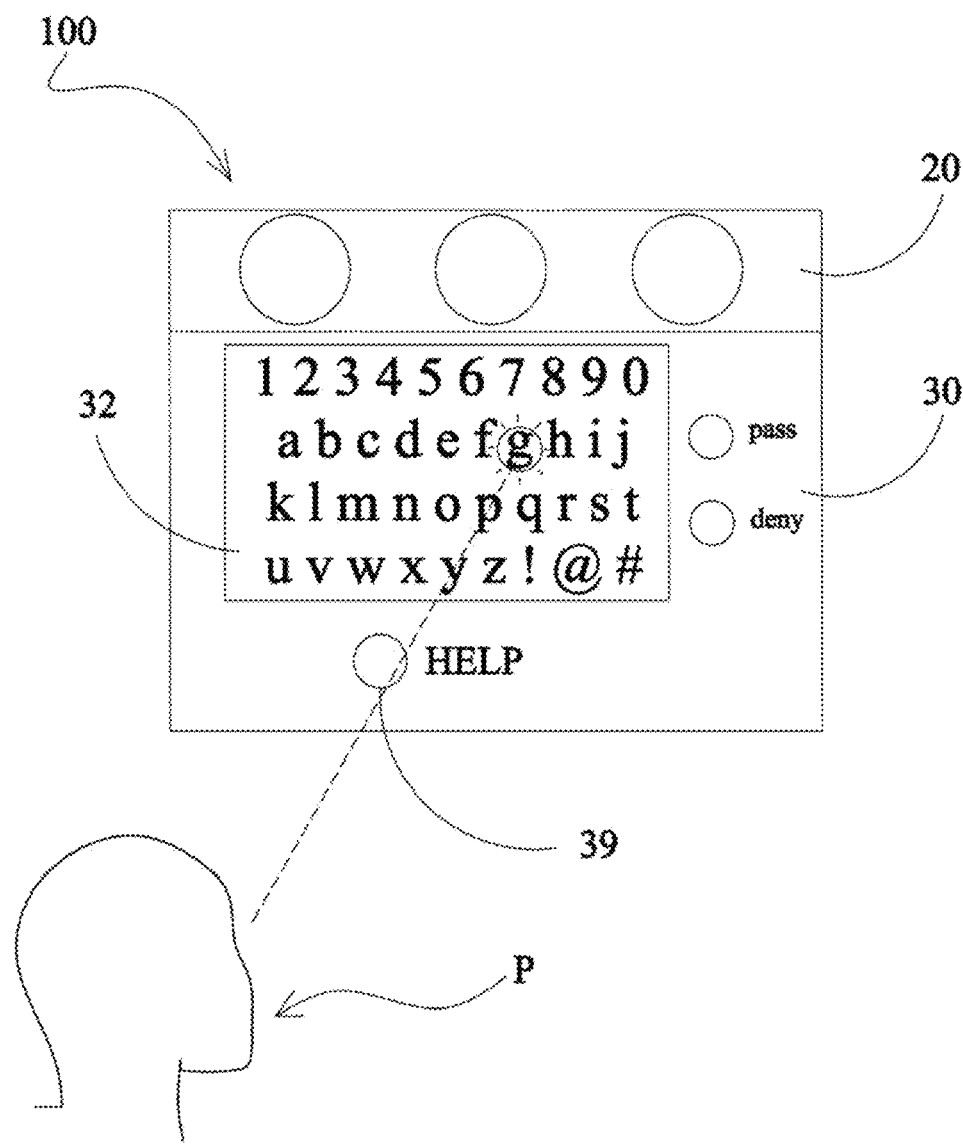
FIG. 7 is a diagram showing the practical operation of a password input in the lock shown in FIG. 5 using the gaze tracking password input method of the present invention.
Figure 8:
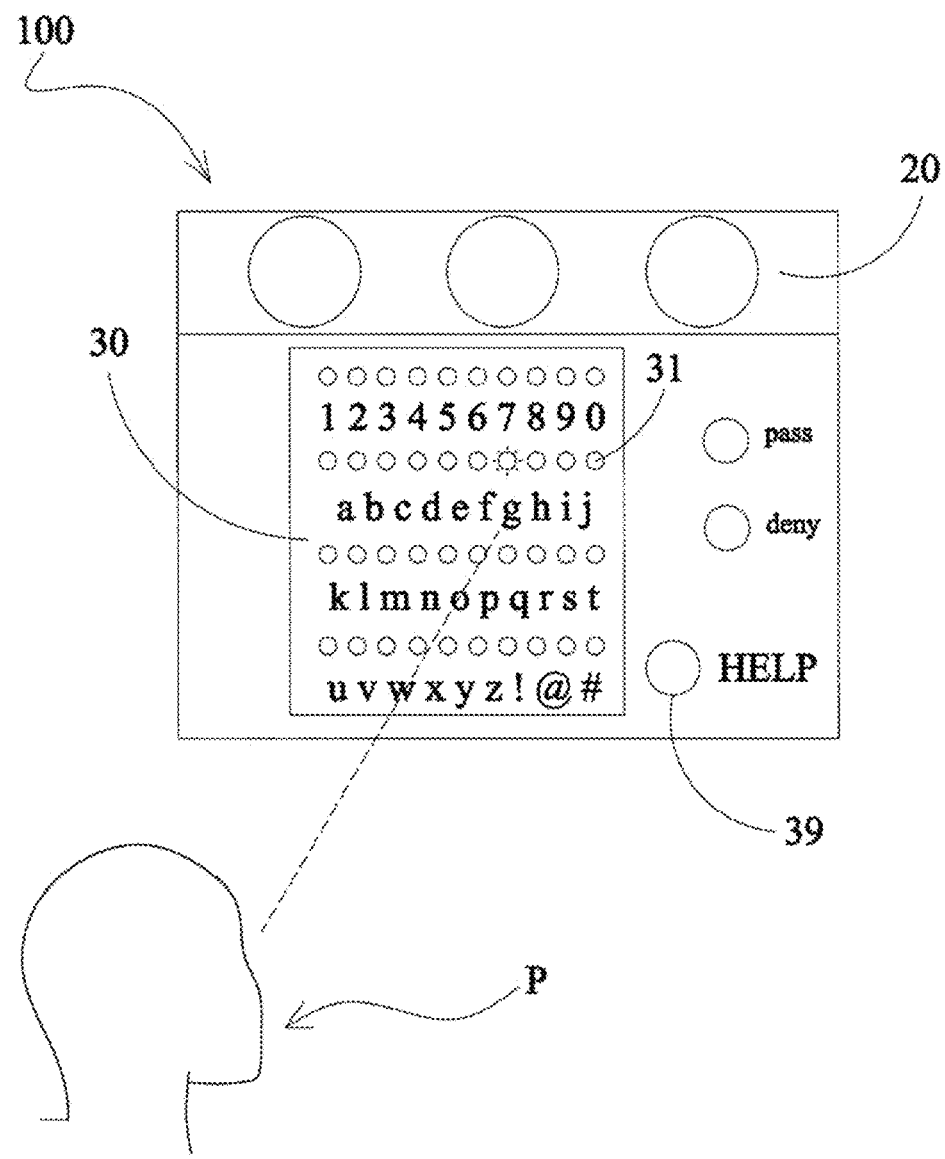
FIG. 8 is a diagram showing another practical operation of a password input in the lock shown in FIG. 5 using the gaze tracking password input method of the present invention.

With the equipment of the shield 40, the password zone 34 as illustrated in FIG. 3 can be removed as shown in FIG. 7. As the operation unit 10 finds out via calculation the person P is gazing at the English letter g, the letter g is illuminated to make the person P aware of the letter g having been successfully input as a password. Moreover, as shown in FIG. 8, an LED 31 can be located at the top of each script shown in the input zone 32 so that as the letter g is identified by the operation unit 10 as the letter being gazed at by the person P, the LED 31 above the letter g will illuminate accordingly. In the layout shown in FIG. 8, the scripts in the input zone 32 can appear in a print form instead of in a lightened screen form.

Figure 9A:
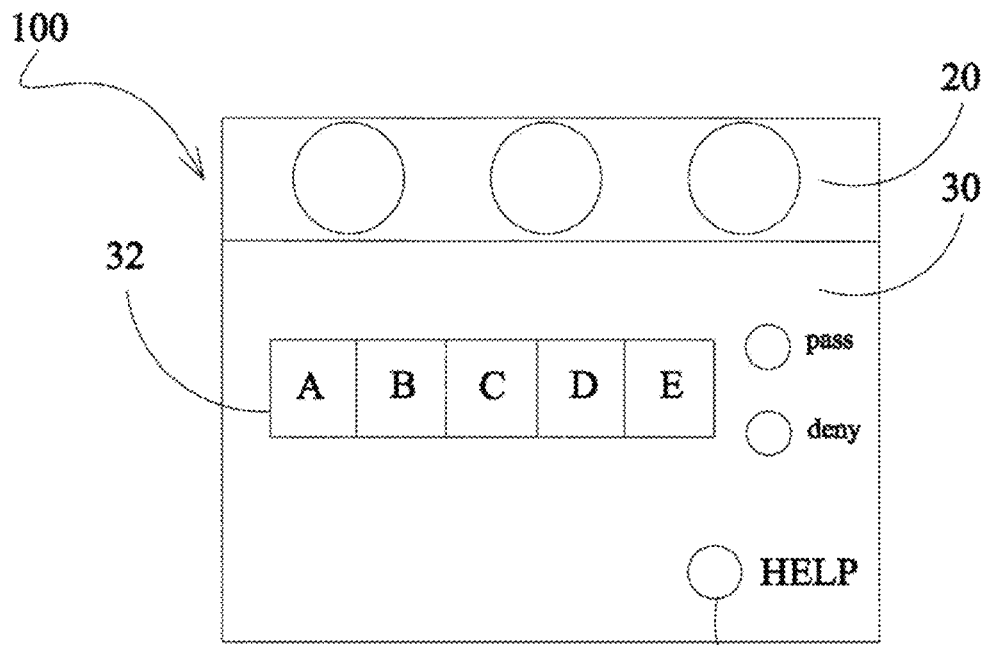
FIGS. 9a and 9b are diagrams showing the other practical operation of a password input in the lock shown in FIG. 5 using the gaze tracking password input method of the present invention.
Figure 9B:
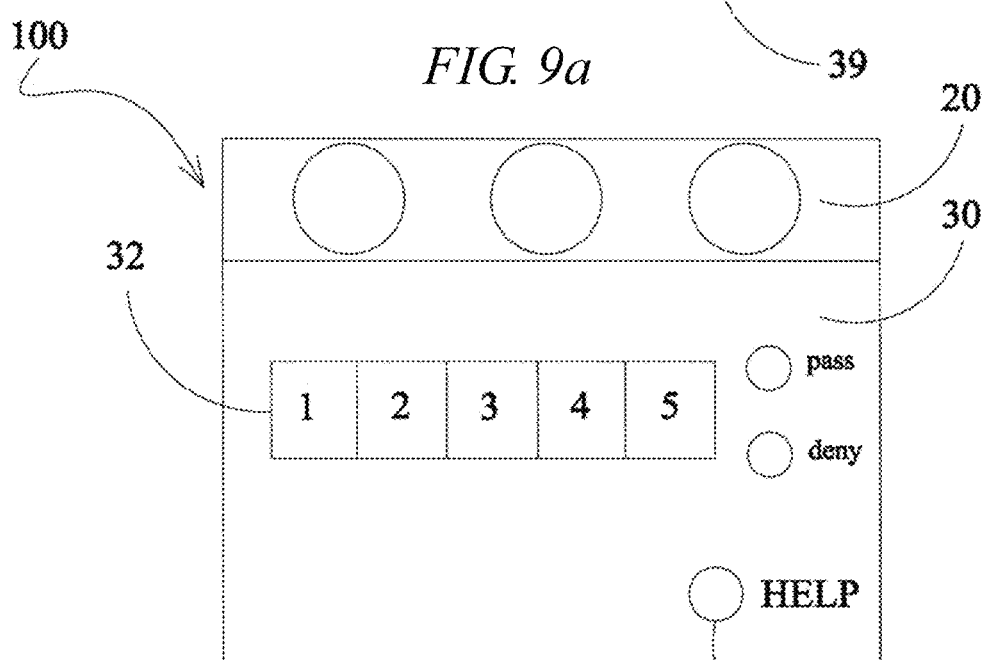

As shown in FIGS. 9a and 9b, there is another embodiment of the input zone 32 in which the scripts are variable. In FIG. 9a, the scripts shown in the input zone 32 are A, B, C, D, E, but after a period of time, the scripts shown in the input zone 32 will be changed to 1, 2, 3, 4, 5. The person P can pick out from the letters A, B, C, D, E as input of the passwords in the first stage, and at a second stage, the numerals 1, 2, 3, 4, 5 can be chosen as the input of passwords.

Moreover, in order to prevent a person P under abduction from being forced to input passwords, as shown in the embodiment of the present invention from FIG. 5 to FIG. 8, a help-seeking script 39 is provided. As the person P under abduction is being forced to input passwords, the person P can gaze at the help-seeking script 39, and when the operation unit 10 is activated to confirm that the person P is gazing at the help-seeking script 39, the operation unit 10 will send out rescue alarm signals to security guards for rescue so as to permit people to seek help in silence. Consequently, the person P or user must be in conscious will to input the password. As the user under abduction is being forced to input passwords, the user can gaze at the help-seeking script 39 to ask for help, the system will send out rescue alarm signals to the police station.

The gaze tracking password input method of the present invention can also be applied to the input of password of automatic cash dispensers or other electronic appliance.

By means of the precedent gaze tracking password input method, leakage of input passwords can be effectively prevented. It can be widely applied to locks, such as household door locks, door locks for hotels and doors for property safes. Furthermore, the present method can also be applied to the password input operation in automatic cash dispenser and any other procedures in need of password identification.

While the invention has been particularly shown and described with reference to the preferred embodiments thereof, it will be understood by those skilled in the art that various changes in form and details may be made without departing from the spirit and scope of the invention. It is intended to cover various modifications and similar arrangements and procedures, and the scope of the appended claims therefore should be accorded the broadest interpretation so as to encompass all such modifications and similar arrangements and procedures.

What is claimed is:

1. A gaze tracking password input method, comprising the following steps:
    setting up a password input device, comprising a photographing unit, a display unit, and an operation unit;
    said photographing unit continually picking up photo images of a particular area which are transmitted to said operation unit;
    a person approaching said password input device with eyes of the person coming into the particular area so that said photographing unit can take photo images of the eyes of said person, which are transmitted to said operation unit;
    said operation unit identifying the person's approach;
    the eyes of said person gazing onto an input zone for input of a password;
    said operation unit determining the input photo images of the person's eyes gazing at numerals, characters or symbols provided in said input zone picked up by said photographing unit;
    inputting the numerals, characters, or symbols defined in said input zone that said person's eyes gazes at as one or more inputs of a password into one or more input boxes;
    when all of said one or more input boxes are inputted, said operation unit comparing the input numerals, characters, or symbols with preset passwords; and
    approving the person's identification in response to the comparing of the input numerals, characters, or symbols matching at least one of said preset passwords.

2. A gaze tracking password input method as claimed in claim 1, further comprising the following steps, wherein:
    as said operation unit identifying said person's approach, said input zone and a password zone appear in said display unit; said input zone is provided with a plurality of said numerals, characters, or symbols; said password zone is provided with a plurality of said input boxes; and
    as said operation unit identifies one of said numerals, characters, or symbols, one of said input boxes in said password zone is marked as having been filled in with one said password.

3. A gaze tracking password input method as claimed in claim 2, wherein said operation unit further comprises a storage unit; said input numerals, characters, or symbols will be stored first in said storage unit until all inputs in said input boxes of said password zone are marked completed, wherein said numerals, characters, or symbols in said input zone are variable with time; then said operation unit will compare all said input numerals, characters, or symbols in said storage unit with a set of said preset passwords.

4. A gaze tracking password input method as claimed in claim 1, wherein each of scripts including said numerals, characters, or symbols as being gazed at by said person in said input zone are illuminated to indicate one said gazed script having been input as one said password.

5. A gaze tracking password input method as claimed in claims 4, wherein said input zone is provided with a shield having a window defined thereon so that said person in operation can gaze at said input zone through said window.

6. A gaze tracking password input method as claimed in claim 1 wherein a light means disposed on top of each of scripts including said numerals, characters, or symbols as being gazed at by said person in said input zone are illuminated to indicate one said gazed script having been input as one said password.

7. A gaze tracking password input method as claimed in claims 6, wherein said input zone is provided with a shield having a window defined thereon so that said person in operation can gaze at said input zone through said window.

8. A gaze tracking password input method as claimed in claim 1, wherein said input zone is provided with a help-seeking script so that as said operation unit identifies said person is gazing at said help-seeking script, said operation unit will send out a rescue alarm signal accordingly.

9. A device using said gaze tracking password input method, comprising:
a password input device comprising:
a photographing unit continually picking up photo images at a particular area, and
an operation unit operatively connected to said photographing unit which transmits all said picked up photo images to said operation unit; and
a display unit operatively connected to said operation unit, wherein
when a person approaches said photographing unit with eyes of said person coming up to said particular area, said photographing unit continually picks up photo images of the eyes of said person, said operation unit determines the eyes of said person gazing at at least one script having numerals, characters, or symbols presented in an input zone on said display unit, said operation unit generates the numerals, characters or symbols from the at least one script gazed at by the eyes of said person as inputs for a password, said operation unit compares said input password with a preset password; and if a comparison of said input password and said preset password is matched, said operation unit approves said person's identification.

10. A device using said gaze tracking password input method as claimed in claim 9, wherein said display unit includes said input zone and a password zone, and in said input zone is provided with a plurality of said numerals, characters, or symbols and said password zone is provided with a plurality of input boxes.

11. A device using said gaze tracking password input method as claimed in claim 10, wherein said operation unit further includes a storage unit in which said input numerals, characters, or symbols are first stored until all said input boxes in said password zone have been marked input; and then said operation unit will compare said input numerals, characters, or symbols with said preset passwords.

12. A device using said gaze tracking password input method as claimed in claim 9, wherein said numerals, characters, or symbols in said input zone are individually illuminated when said operation unit identifies said person gazing at said at least one script so as to indicate said at least one script as having been input as said input password.

13. A device using said gaze tracking password input method as claimed in claims 12, wherein a shield having a window defined thereon is provided to cover said input zone and the eyes of said person can gaze at said input zone through said window.

14. A device using said gaze tracking password input method as claimed in claim 9, wherein said numerals, characters, or symbols having a light means disposed on top thereof in said input zone are individually illuminated when said operation unit identifies said person gazing at said at least one script so as to indicate said at least one script as having been input as said input password.

15. A device using said gaze tracking password input method as claimed in claims 14, wherein a shield having a window defined thereon is provided to cover said input zone and the eyes of said person can gaze at said input zone through said window.

16. A device using said gaze tracking password input method as claimed in claim 9, further comprising a lock mechanism in engagement with said password input device; when said operation unit approves of said person's identification, said password input device transmits a control signal to said lock mechanism mounted onto a door body for locking said door to get said lock mechanism unlocked.

17. A device using said gaze tracking password input method as claimed in claim 9, wherein said input zone is further provided with a help-seeking script so that when said operation unit identifies that said help-seeking script is being gazed at by said person, said operation unit sends out a rescue alarm signal accordingly.

* * * * *